United States Patent [19]
Maynard

[11] Patent Number: 5,875,806
[45] Date of Patent: Mar. 2, 1999

[54] FLOW CONTROL VALVE WITH INCREASED FLOW RANGE

[75] Inventor: Frederick C. Maynard, Cave Creek, Ariz.

[73] Assignee: AlliedSignal Inc., Morris Township, N.J.

[21] Appl. No.: 956,137

[22] Filed: Oct. 22, 1997

[51] Int. Cl.$^6$ .................................................. G05D 7/01
[52] U.S. Cl. ............................. 137/8; 137/502; 137/613
[58] Field of Search .................................... 137/500, 501, 137/502, 613, 8

[56] References Cited

U.S. PATENT DOCUMENTS

| | | | |
|---|---|---|---|
| 1,745,256 | 1/1930 | Groble . | |
| 1,922,954 | 8/1933 | Hughes . | |
| 2,286,188 | 6/1942 | MacLean . | |
| 2,308,187 | 1/1943 | MacLean . | |
| 3,596,677 | 8/1971 | Clark | 137/501 |
| 3,648,460 | 3/1972 | Johnson . | |
| 3,853,142 | 12/1974 | Grundman | 137/501 |
| 4,052,897 | 10/1977 | DeBaun . | |
| 4,745,739 | 5/1988 | Bezard . | |
| 4,862,912 | 9/1989 | Stoll . | |
| 4,926,629 | 5/1990 | Eick . | |
| 4,991,392 | 2/1991 | Goldberg et al. | 137/501 |
| 5,368,273 | 11/1994 | Dante . | |

FOREIGN PATENT DOCUMENTS

| | | | |
|---|---|---|---|
| 2033834 | 1/1972 | Germany | 137/502 |

*Primary Examiner*—Stephen M. Hepperle
*Attorney, Agent, or Firm*—Jerry J. Holden

[57] ABSTRACT

A fluid metering system comprises a source of pressurized fluid, a proportional metering valve and a delta-p regulator, which maintains a constant pressure drop across the proportional metering valve. The delta-p regulator is referenced to the static pressure upstream of the metering valve and the stagnation pressure downstream of the metering valve. By referencing the stagnation pressure downstream of the metering valve, the effective static pressure across the metering valve increases as a function of fluid flow rate and therefore provides an increased flow range and corresponding turndown ratio for any given proportional metering valve.

9 Claims, 3 Drawing Sheets

FLOW CONTROL VALVE WITH INCREASED FLOW RANGE

STATEMENT OF U.S. GOVERNMENT RIGHTS

The invention was made in the course of work conducted under contract No. F33657-91-C-006 with the Department of the Air Force. The United States Government has certain rights herein.

BACKGROUND OF THE INVENTION

This invention relates to fluid flow control systems, in particular to fuel delivery systems for gas turbine engines.

Fuel delivery systems for gas turbine engines typically fall into one of two classes, based on whether the source of pressurized fuel is a positive displacement pump or a non-positive displacement source, such as a centrifugal or vortex pump. Positive displacement pump systems are typically very complex and expensive as compared with non-positive displacement systems, which have a significant advantage in terms of the cost and simplicity of the metering system. Since the source of pressurized fuel in a non-positive displacement system is at a constant pressure irrespective of flow rate, the flow metering valve can be a simple metered orifice, such as the fuel metering valve disclosed in U.S. Pat. No. 5,368,273, which is incorporated herein by reference.

A conventional non-positive displacement fuel system capable of open loop operation utilizes a "delta-p" regulator, which is a special pressure regulator adapted to provide a fixed pressure drop across the metering valve irrespective of the fuel flow rate. It is well known that the flow rate of a substantially incompressible fluid such as jet fuel across a fixed pressure drop is proportional to the size of the metering orifice. Accordingly, by fixing the pressure drop across a metering valve, fuel flow through the metering valve is accurately controlled simply by adjusting the size of the metering orifice, for example by moving a needle valve in and out of the orifice.

Certain metering valves used in non-positive displacement fuel systems are limited, however, in their ability to meet the full range of flow requirements of modern high performance turbine engines. If operated at a first pressure differential, although the minimum flow requirements can be met, the maximum flow requirements cannot be met due to head losses in the system. If operated at a second, higher, pressure differential, the maximum flow requirements can be met, but the minimum flow requirements cannot be met within an acceptable degree of linearity due to the dominance of the non-linear effects of a severely choked metering orifice.

SUMMARY OF THE INVENTION

The present invention overcomes the flow range limitations of the prior art fuel metering systems by referencing the delta-p regulator to the stagnation pressure downstream of the metering valve rather than the static pressure. According to an embodiment of the invention, a fuel delivery system comprises a source of fuel under pressure, a delta-p regulator and a metering valve. The delta-p regulator valve has an input port, an output port, and a reference port and provides a substantially constant pressure difference between its output port and its reference port (which correspond to the input and output of the metering valve, respectively). The reference port of the delta-p regulator is connected to a stagnation pressure probe placed in the flow exiting the metering valve, such that the fixed pressure differential regulated by the delta-p regulator is between the substantially static pressure entering the metering valve and the stagnation pressure exiting the metering valve.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

Figure 1:
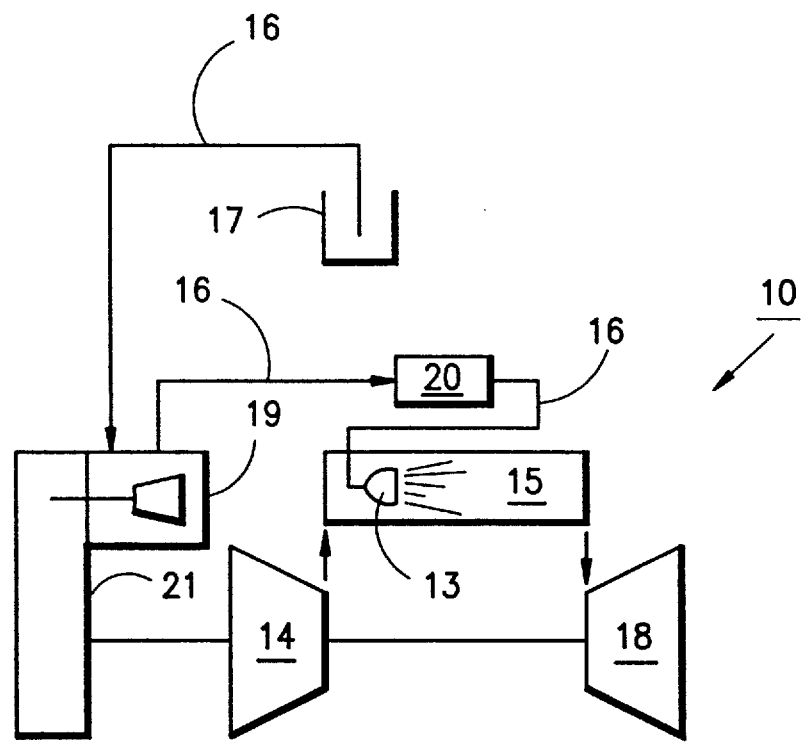
FIG. 1 is a schematic of a gas turbine engine incorporating a fuel metering system incorporating features of the present invention.

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

FIG. 1 is a schematic of a gas turbine engine 10 comprising a compressor 14, a burner section 15 and a turbine 18. The gas turbine engine further includes a fuel supply system including a fuel tank or reservoir 17 delivering fuel to a non-positive displacement pump 19, which delivers a flow of pressurized fuel to a fuel metering system 20. Pump 19 is typically driven from the main rotating components of the gas turbine engine from a gearbox 21 to provide a substantially constant pressure output to the fuel metering system 20. Metered fuel exiting the fuel metering system 20 is delivered to the downstream load 13, which in the embodiment of FIG. 1, comprise fuel nozzles within the burner section 15. Fluid handling components are interconnected via fluid conveyance means 16, which may be conventional tubing, passages formed in the components themselves, or other conventional means.

Figure 2:
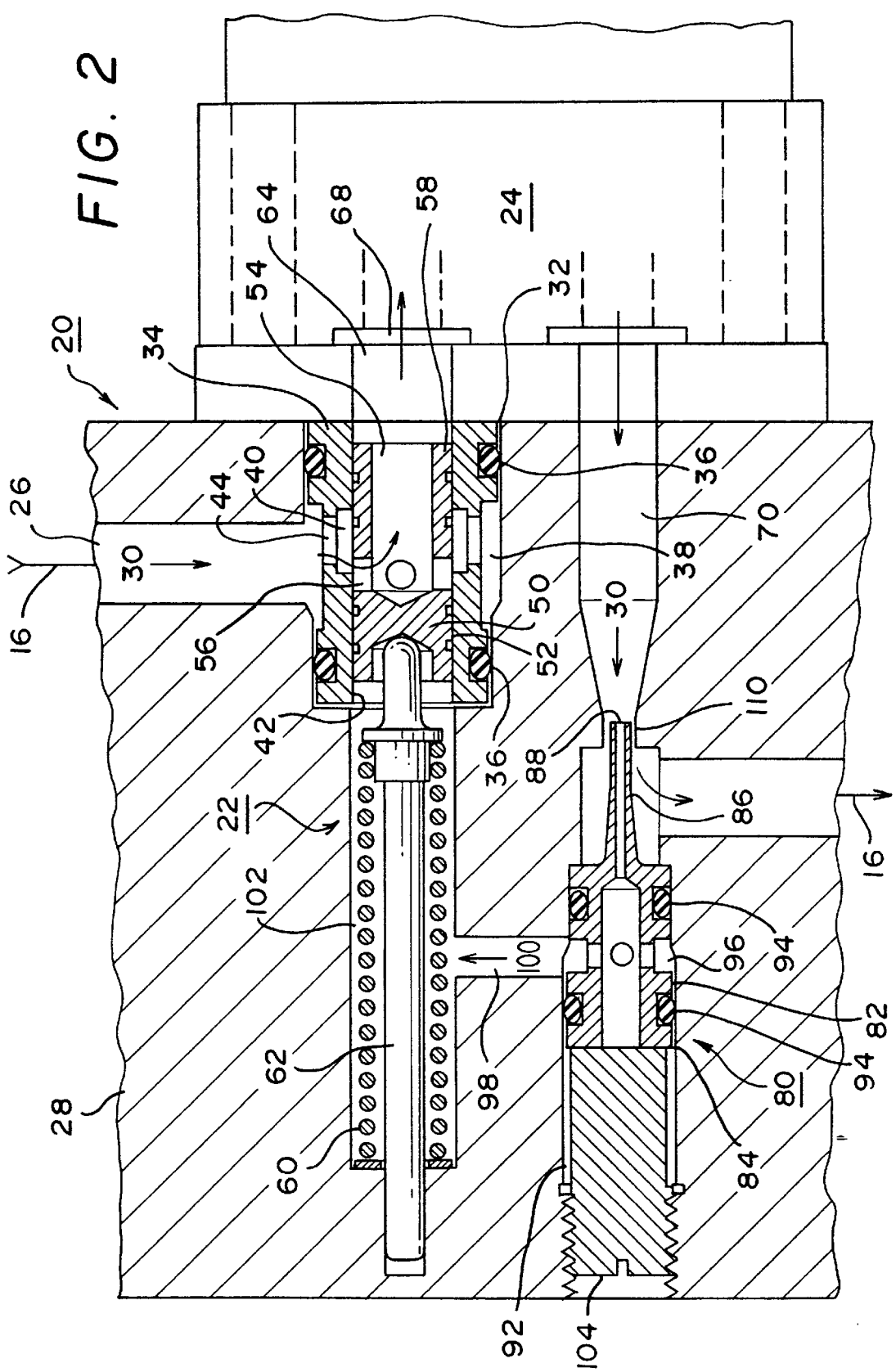
FIG. 2 is a cross sectional view of a fluid metering system incorporating features of the present invention.
Figure 3:
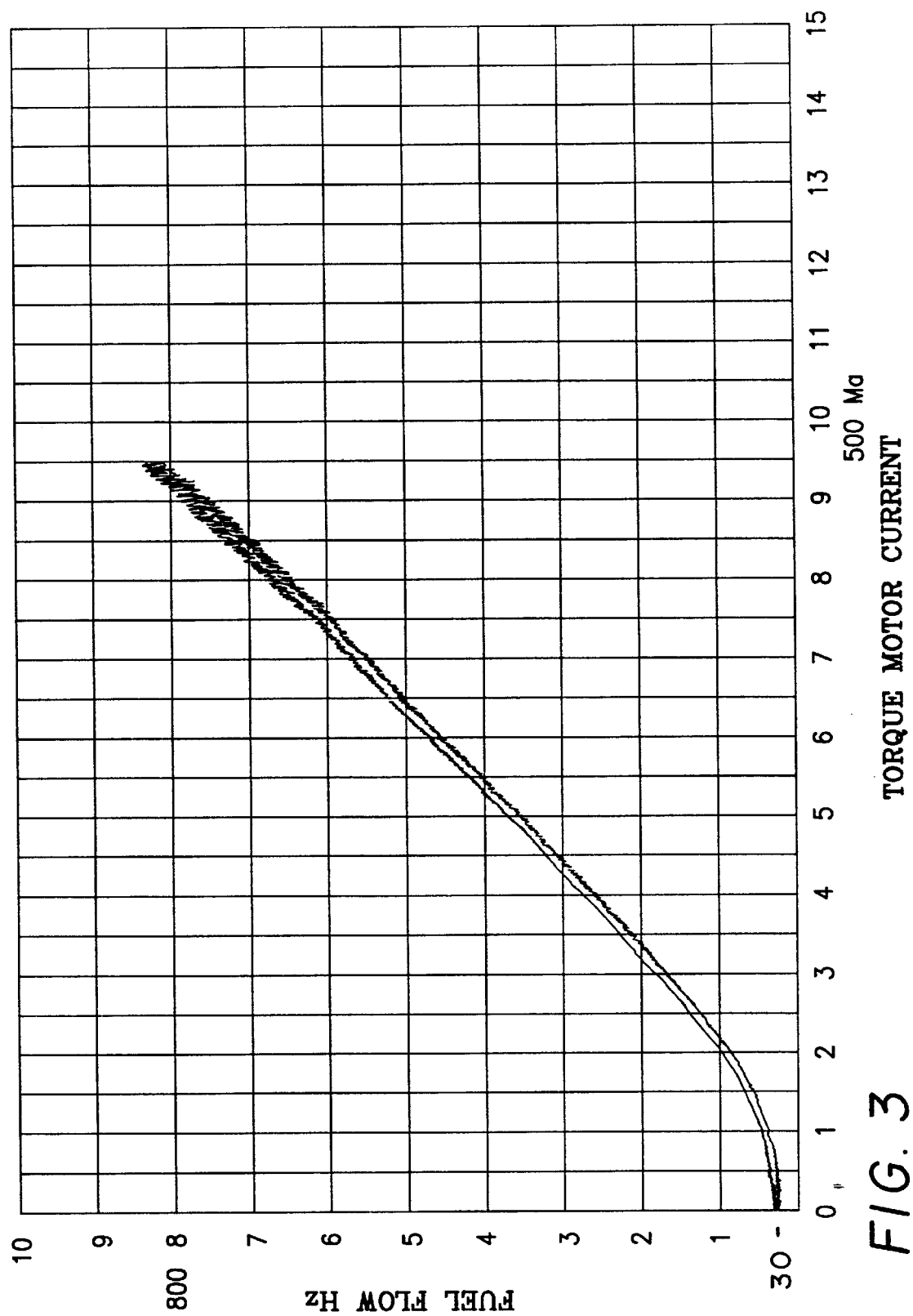
FIG. 3 is a graphical illustration of the flow range of a fuel metering system incorporating features of the present invention.

FIG. 2 is a cross sectional view of a fluid metering system 20 incorporating features of the present invention comprising delta-p regulator 22 and metering valve 24. Metering valve 24, which is only partially shown in FIG. 1 comprises a low-loss venturi metering device such as disclosed in the aforementioned U.S. Pat. No. 5,368,273, a conventional spool/sleeve proportional solenoid valve, a conventional post/clevis torque motor valve, or other conventional proportional metering valve.

Delta-p regulator 22 comprises a housing 28 having an inlet port 26, which receives a flow of fuel 30 from pump 19. Housing 28 includes a bore 32 into which is disposed a valve body 34. Valve body 34 is sealed along its outer diameter against the interior of bore 32 by sealing rings 36. Valve body 34 cooperates with bore 32 to define an annular chamber 38 which is in fluid communication with inlet passage 26. A second annular chamber 40 is disposed in the interior bore 42 of valve body 34. Second annular chamber 40 is in fluid communication with first annular chamber 38 via a plurality of radial ports 44 disposed in valve body 34.

A moveable valving member 50 having a substantially cylindrical outer surface 52 is disposed in a the interior bore 42 of valve body 34. The outer surface 52 and the interior bore 42 are closely toleranced to provide a sliding but substantially fluid tight seal. Moveable valving member 50 includes a counterbore 54, which is in fluid communication with second annular chamber 40 via a plurality of ports 56 disposed in the wall 58 of movable valving member 50. A resilient member such as a compression spring 60 cooperates with a plunger 62 to urge moveable valving member 50 toward a first position in which ports 56 are fully uncovered to communicate with second annular chamber 40 to provide a maximum flow of fluid through delta-p regulator 22. Pressure of the fluid passing through moveable valve member into outlet port 64 urges valving member 50 against the force of spring 60 and plunger 62 toward a second position in which ports 56 are fully covered. FIG. 2 shows valving member 50 in an intermediate position in which ports 56 are partially uncovered to communicate with annular chamber 40.

Fuel exits delta-p regulator 22 via outlet port 64 and enters metering valve 24 via entrance passage 68. Metering valve 24 meters the fuel flow by conventional means and discharges the metered fuel via exit passage 70 which conveys the metered fuel to fluid conveyance means 16, which in turn conveys the metered fuel to the downstream load 13.

Disposed in exit passage 70 is stagnation probe 80. Stagnation probe 80 comprises probe body 82 having a relatively larger diameter end 84 and a relatively small diameter thin walled tube portion 86. Thin walled tube portion 86 has its longitudinal axis aligned with the flow of fluid 30 in exit passage 70 and has an opening 88 facing the flow of fluid 30. Body 82 includes a plurality of ports 96 which provide fluid communication between thin walled tube portion 86 and a reference port 98 of delta-p regulator 22. Body 82 is retained in bore 92 by retainer 104 and sealed to bore 92 by sealing rings 94.

In operation, the flow of fluid 30 in exit passage 70 has a stagnation pressure, which is equal to the static plus the dynamic pressure of the moving pressurized fluid. By decelerating a portion of the flow of fluid 30 in exit passage 70, the stagnation pressure probe 82 converts the stagnation pressure into an equivalent static pressure signal, which is conveyed to plunger chamber 102 via reference port 98. The stagnation pressure signal 100 as transmitted to chamber 102 acts in cooperation with plunger 62 to urge moveable valving member further toward the first position. The stagnation pressure signal 100 is greater than the static pressure in exit passage 70 (such as would measured using a static wall tap disposed in exit passage 70). Stagnation pressure signal 100 also increases as a function of flow velocity. Accordingly, use of the stagnation pressure signal 100 to bias delta-p regulator 22 increases the effective static pressure drop across metering valve 24 as a function of increasing velocity, which effectively increases the flow range of the metering valve 24.

In order to amplify the dynamic component of the stagnation pressure signal, a nozzle 110 may be incorporated into exit passage 70 to increase the velocity of the fluid flow in the region of stagnation probe 80. By varying the size of the nozzle relative to exit passage 70, the sensitivity of the delta-p regulator to fluid flow rate can be tailored to a particular application.

A working model was constructed, which demonstrated the improvement in turndown ratio effected by the present invention. A conventional post/clevis torque-motor metering valve was operatively attached to a source of pressurized fluid with a delta-p valve adapted to hold a 25 psi pressure differential across the metering valve. Although the valve was able to produce a maximum flow of 347 lb/hr, the valve was only capable of producing a minimum flow of 17.4 lb/hr, for a turndown ratio of 19.9. When the delta-p valve was adjusted to provide a 20 psi differential across the metering valve, a minimum flow of 15 lb/hr was achieved, but a maximum flow of only 308 lb/hr was achieved, for a turndown ratio of 20.5. However, as shown in FIG. 2, when the same metering valve was used in conjunction with a fuel metering system in accordance with the teachings of the present invention, a minimum flow of 30 Hz (14.8 lb/hr) and a maximum flow of 830 Hz (346 lb/hr) was achieved, for a turndown ratio in excess of 23.

Although the invention has been described in terms of the illustrative embodiment, it will be appreciated by those skilled in the art that various changes and modifications may be made to the illustrative embodiment without departing from the spirit or scope of the invention. For example, although the illustrative embodiment is intended primarily for regulation of fuel to a gas turbine engine, the any application in which a proportional metering valve is used to regulate the flow of a liquid would be considered within the scope of the present invention. Accordingly it is intended that the scope of the invention not be limited in any way to the illustrative embodiment shown and described but that the invention be limited only by the claims appended hereto.

What is claimed is:

1. A fluid delivery system comprising:
   a source of fluid under pressure;
   a delta-p regulator valve having an input port, an output port, and a reference port, said input port being in fluid communication with said source of fluid under pressure, said delta-p regulator valve regulating a flow of fluid from said source of fluid under pressure to provide a substantially constant pressure difference between said output port and said reference port;
   a metering valve having an entrance passage and an exit passage, said entrance passage being in fluid communication with said output port of said regulator valve;
   a first fluid conveyance means for conveying fluid from said exit passage to a downstream component;
   a stagnation pressure probe operatively disposed in said fluid conveyance means for receiving a stagnation pressure signal of a flow in said transfer passage; and
   a second fluid conveyance means for conveying said stagnation pressure signal to said reference port of said delta-p regulator valve.

2. The fluid delivery system of claim 1, further comprising:
   a nozzle disposed within said second fluid conveyance means for enhancing a velocity component of said stagnation pressure signal.

3. The fluid delivery system of claim 1, wherein:
   said stagnation pressure probe comprises:
      a housing having a signal input port and a signal output port, said signal input port comprising a thin tube disposed in said second fluid conveyance means, said thin tube having an axis oriented parallel to a flow of fluid in said second fluid conveyance means and having an open end facing said flow of fluid.

4. The fluid delivery system of claim 1, wherein:
   said delta-p regulator valve comprises:
      a housing defining a cylindrical bore having an annular chamber therein disposed, said annular chamber being in fluid communication with said input port;

a slide valve comprising a body having a substantially cylindrical outer surface and a hollow counterbore therein, said body further comprising a plurality of ports opening from said counterbore to said outer surface, said slide valve being disposed within said cylindrical bore and moveable between a first position in which said plurality of ports are aligned with said annular chamber to permit a maximum flow of fluid therethrough and a second position in which said plurality of ports are offset from said annular chamber thereby substantially preventing fluid flow therethrough; and a resilient member, said resilient member cooperating with said stagnation pressure signal for urging said slide valve toward said first position.

5. A fuel metering valve for metering fuel to a gas turbine engine, comprising:

a delta-p regulator valve having an input port, an output port, and a reference port, said regulator valve providing a substantially constant pressure differential between said output port and said reference port;

a metering valve having an entrance passage and an exit passage, said entrance passage being in fluid communication with said output port of said delta-p regulator valve;

a first fluid conveyance means for conveying fluid from said exit passage to a downstream component;

a stagnation pressure probe operatively disposed in said fluid conveyance means for receiving a stagnation pressure signal of a flow in said transfer passage; and a second fluid conveyance means for conveying said stagnation pressure signal to said reference port of said delta-p regulator valve.

6. The fuel metering valve of claim 5, further comprising a nozzle disposed within said second fluid conveyance means for enhancing a velocity component of said stagnation pressure signal.

7. The fuel metering valve of claim 5, wherein:

said stagnation pressure probe comprises:

a housing having a signal input port and a signal output port, said signal input port comprising a thin tube disposed in said second fluid conveyance means, said thin tube having an axis oriented parallel to a flow of fluid in said second fluid conveyance means and having an open end facing said flow of fluid.

8. The fuel metering valve of claim 5, wherein:

said delta-p regulator valve comprises a slide valve moveable between a first position for providing a relatively unobstructed flow of fuel and a second position for providing a relatively restricted flow of fuel, said slide valve being urged toward said first position by a resilient member cooperating with said stagnation pressure signal and urged toward said second position by a static pressure signal at said output port of said delta-p regulator valve.

9. A method of increasing the turndown ratio of a proportional metering valve having an inlet and an outlet, said proportional metering valve used in conjunction with a delta-p regulator having a moveable valve member, the method comprising:

sensing a first pressure at said inlet to said proportional metering valve;

sensing a second pressure at said outlet of said proportional metering valve, said second pressure comprising a stagnation pressure sensed using a stagnation pressure probe;

moving said moveable valve member to regulate a flow of fluid through said delta-p regulator in response to a difference in pressure between said second pressure and said first pressure.

* * * * *